(12) United States Patent
MacIsaac et al.

(10) Patent No.: US 7,079,614 B2
(45) Date of Patent: Jul. 18, 2006

(54) METHOD OF GENERATING A MEASURE OF A MISTIMING AND APPARATUS THEREFOR

(75) Inventors: William Ross MacIsaac, Fife (GB); Alexander Ballantyne, Edinburgh (GB)

(73) Assignee: Agilent Technologies, Inc., Palo Alto, CA (US)

( * ) Notice: Subject to any disclaimer, the term of this patent is extended or adjusted under 35 U.S.C. 154(b) by 544 days.

(21) Appl. No.: 10/301,306

(22) Filed: Nov. 21, 2002

(65) Prior Publication Data

US 2004/0101076 A1 May 27, 2004

(51) Int. Cl.
*H04L 7/00* (2006.01)
(52) U.S. Cl. .................................. 375/354; 375/371
(58) Field of Classification Search ................ None
See application file for complete search history.

(56) References Cited

U.S. PATENT DOCUMENTS 4,871,973 A * 10/1989 Yoshihara ............... 329/308
4,977,580 A * 12/1990 McNicol ................. 375/344
6,621,860 B1 * 9/2003 Yamaguchi et al. ......... 375/226

* cited by examiner

*Primary Examiner*—Jay K. Patel
*Assistant Examiner*—Curtis Odom

(57) ABSTRACT

Known apparatus for measuring jitter in a signal under test employ narrowband filters and limiters that have technological limitations when the bit rate of the signal under test is around 40 Gbps. The present invention avoids the use of the above-mentioned elements by firstly wideband filtering an extracted clock signal and mixing the filtered clock signal down to baseband using a quadrature demodulator to yield a complex baseband signal. Prior to conversion of the complex baseband signal to the digital domain, the quadrature components of the complex baseband signal are low-pass filtered. Subsequently, digitized signals are converted to a polar form having an amplitude and phase, the phase being weighted by the amplitude prior to measurement of the phase in order to incorporate a measure of confidence in the phase relating to a density of transitions in the signal under test.

12 Claims, 3 Drawing Sheets

METHOD OF GENERATING A MEASURE OF A MISTIMING AND APPARATUS THEREFOR

BACKGROUND OF THE INVENTION

The present invention relates to a method of generating a measure of a mistiming in a signal under test, for example, a signal for an optical communications system, such as a Synchronous Optical NETwork (SONET). The present invention also relates to an apparatus for generating the measure of the mistiming in the signal under test.

BRIEF DESCRIPTION OF RELATED DEVELOPMENTS

In a digital communications network, errors in information communicated between elements in the communications network are attributable to a number of different factors. Consequently, a fundamental ability of every digital communication system is to receive a degraded signal and regenerate the degraded signal. Nevertheless, errors can still be caused by mistimings inside transmission equipment when data is regenerated.

When mistimings become large, the errors that are produced cause the communications network to become unusable. However, even when the mistimings are relatively low, phase and noise margins of the signals being transmitted is increased, thereby degrading performance of the network. Additionally, there are different causes of the mistimings. For example, the mistimings may be the result of a pattern dependency, or due to noise sources, such as thermal noise or crosstalk. The mistimings can also be caused by de-multiplexing (justification) in Plesiochronous Digital Hierarchy (PDH) systems or pointer movements in Synchronous Digital Hierarchy (SDH)/SONET systems.

Mistimings can be classified as: skew, wander or jitter, depending upon a frequency within which the mistimings fall. Slow variations in signal timing through a network are called "wander", whereas higher speed variations in the signal timing are called "jitter". In the frequency domain, the division between jitter and wander is located at 10 Hz. In order to distinguish between jitter and wander when measuring a signal for mistimings, a single pole low-pass filter having a −3 dB point at 10 Hz is used to isolate wander and a high-pass filter having a respective −3 dB point at 10 Hz is used to isolate jitter.

In terms of an eye diagram viewed on an oscilloscope, jitter causes eye-closure in the horizontal axis, preventing correct sampling of a data signal and ultimately results in bit errors. Even if the, jitter does not directly cause errors, the jitter can reduce a noise margin of the system, increasing the systems susceptibility to errors.

In order to measure jitter, a known system comprises an eXclusive OR (XOR) gate for extracting a local clock signal from a data signal under test, the XOR gate having two inputs. A first input of the XOR gate is coupled to the signal under test and a second input of the XOR gate is coupled to a source of a modified version of the signal under test, the modified version of the signal under test being the signal under test delayed by approximately one half of one period of the signal under test. An output of the XOR gate is coupled to an input of a narrowband filter to recover the extracted clock signal, an output of the narrowband filter being coupled to an input of a limiter, or comparator. An output of the limiter is coupled to a first input of a phase detector via a first frequency divider. A second input of the phase detector is coupled to a reference oscillator of a Phase Locked Loop (PLL) via a second frequency divider. The PLL is provided to lock the reference oscillator to a long term average, for example, over a period of time corresponding to a bandwidth of less than 10 Hz, of the recovered clock signal frequency. The PLL also comprises a loop filter coupled to an output of the phase detector, the output of the loop filter being coupled to the reference oscillator to complete the loop of the PLL. The output of the phase detector is also coupled to an input of a measurement filter in order to yield a voltage signal corresponding to the amount of jitter detected in the signal under test, an output of the measurement filter being coupled to measurement circuitry suitably arranged to measure the voltage signal in a number of ways.

Whilst the above described measurement system can measure jitter, the variation in the density of transitions in the signal means that the output of the narrowband filter possesses a high dynamic range. Also, it is important, especially when dealing with high frequency signals, to match the centre frequency of the narrowband filter with the frequency of the signal under test, otherwise the presence of the narrowband filter exaggerates the measured jitter. Matching the centre frequency of the narrowband filter at high frequencies is difficult to achieve.

At higher bit rates for example, 40 Gbps and above) currently being proposed for use in communications systems, the Amplitude Modulation and Phase Modulation distortion of the limiter mentioned above can only be maintained for a restricted dynamic range imposed by current technological limitations. Consequently, for bit rates of around 40 Gbps and above, no suitable limiters exist and reliable fabrication of the narrowband filter is also problematic. Additionally, when the transition density of the signal under test is sufficiently low over a time period exceeding the time constants of the measurement bandwidth of the narrowband filter, the occurrences of transitions necessary to measure jitter are reduced, resulting in a reduction in the amplitude of a filter output signal found at the output of the narrowband filter. This reduction in the amplitude of the filter output signal translates into a reduction in the confidence one can have in the accuracy in the phase measurement of the signal under test due, effectively, to an increase in noise.

One solution to the above problem posed by the occasional reduction in the transition density of the signal under test is to replace the narrowband filter and the limiter with an Injection Locked Oscillator (ILO). The ILO extracts a local clock signal from an input signal and sustains the local clock signal at an output of the ILO even over periods of time when the input signal does not contain any transitions. However, as in the case of the narrowband filter, it is important to match the centre frequency of the ILO with the frequency of the input signal and this is currently difficult to achieve at high frequencies. Additionally, the centre frequency of the ILO can drift in response to changes in temperature.

SUMMARY OF THE INVENTION

According to a first aspect of the present invention, there is provided a method of generating a measure of a mistiming in a signal under test, the method comprising the steps of: determining a clock signal from the signal under test; filtering the clock signal in respect of a first band of frequencies; translating the filtered clock signal to baseband so as to provide a complex baseband signal having a real component and an imaginary component; and representing the real and imaginary components in a polar form.

Preferably, the clock signal is wideband filtered, and the method further comprises the step of: low-pass filtering the real and imaginary components in respect of a second band of frequencies prior to representation of the real and imaginary components in the polar form, the second band of frequencies being narrower than the first band of frequencies.

Preferably, the method further comprises the step of: digitising the real and imaginary components prior to representation thereof in the polar form, thereby providing a first digitised signal and a second signal.

Preferably, the real and imaginary components are low-pass filtered prior to digitisation thereof.

Preferably, the step of translating the filtered clock signal to baseband further comprises the step of: mixing the clock signal down to baseband.

Preferably, the step of translating the clock signal to baseband comprises the steps of: translating the clock signal to baseband via an intermediate band of frequencies.

Preferably, the real and imaginary components expressed in the polar form comprise a phase component corresponding to an amount of mistiming in the signal under test. More preferably, the real and imaginary components expressed in the polar form also comprise a magnitude component, and the method further comprises the steps of: weighting changes in the phase component with a weighting factor corresponding to the magnitude component associated with the phase component.

Preferably, the real and imaginary components expressed in the polar form also comprise a magnitude component, and the method further comprises the steps of: disregarding the phase component associated with the magnitude component in response to the magnitude component being below a predetermined magnitude threshold.

Preferably, the method further comprises the step of: measuring the phase component.

Preferably, the method further comprises the step of: using the phase component to generate a control signal to control a source of a reference clock signal for the translation of the clock signal to baseband.

According to a second aspect of the present invention, there is provided a computer program element comprising computer program code means to make a computer execute the method as forth above in relation to the first aspect of the present invention.

Preferably, the computer program element is embodied on a computer readable medium.

According to a third aspect of the present invention, there is provided an apparatus for generating a measure of a mistiming in a signal under test, the apparatus comprising: a clock signal extractor for determining a clock signal from the signal under test; a first filter for filtering the clock signal in respect of a first band of frequencies; a frequency translator for translating the filtered clock signal to baseband so as to provide a complex baseband signal having a real component and an imaginary component; a converter for representing the real and imaginary components in a polar form.

According to a fourth aspect of the present invention, there is provided a use of a frequency translator for translating a clock signal associated with a signal under test so as to provide a complex baseband signal comprising information relating to a mistiming in the signal under test.

It is thus possible to provide a method of, and an apparatus for, measuring a mistiming that does not require the apparatus to comprise difficult-to-manufacture narrowband filters and limiters in order to measure jitter in a signal under test, when the frequency of the signal under test is sufficiently high for technological limitations to prevent reliable and accurate manufacture of the narrowband filters and limiters. In this respect, by mixing an extracted clock signal down to baseband the need to match accurately the centre frequency of the narrowband filter with the frequency of the signal under test is obviated. Consequently, the first stage of filtering that the extracted clock signal undergoes requires a filter, the wideband filter, not requiring the high level of critical performance of the narrowband filter. Additionally, the apparatus and method are sufficiently flexible to lend themselves to the measurement of the mistiming in the signal under test at frequencies below the frequencies that encounter the above mentioned technological limitations.

BRIEF DESCRIPTION OF THE DRAWINGS

At least one embodiment of the invention will now be described, by way of example only, with reference to the accompanying drawings, in which.

Throughout the following description identical reference numerals shall be used to identify like parts.

DETAILED DESCRIPTION OF THE PREFERRED EMBODIMENT(S)

Figure 1:
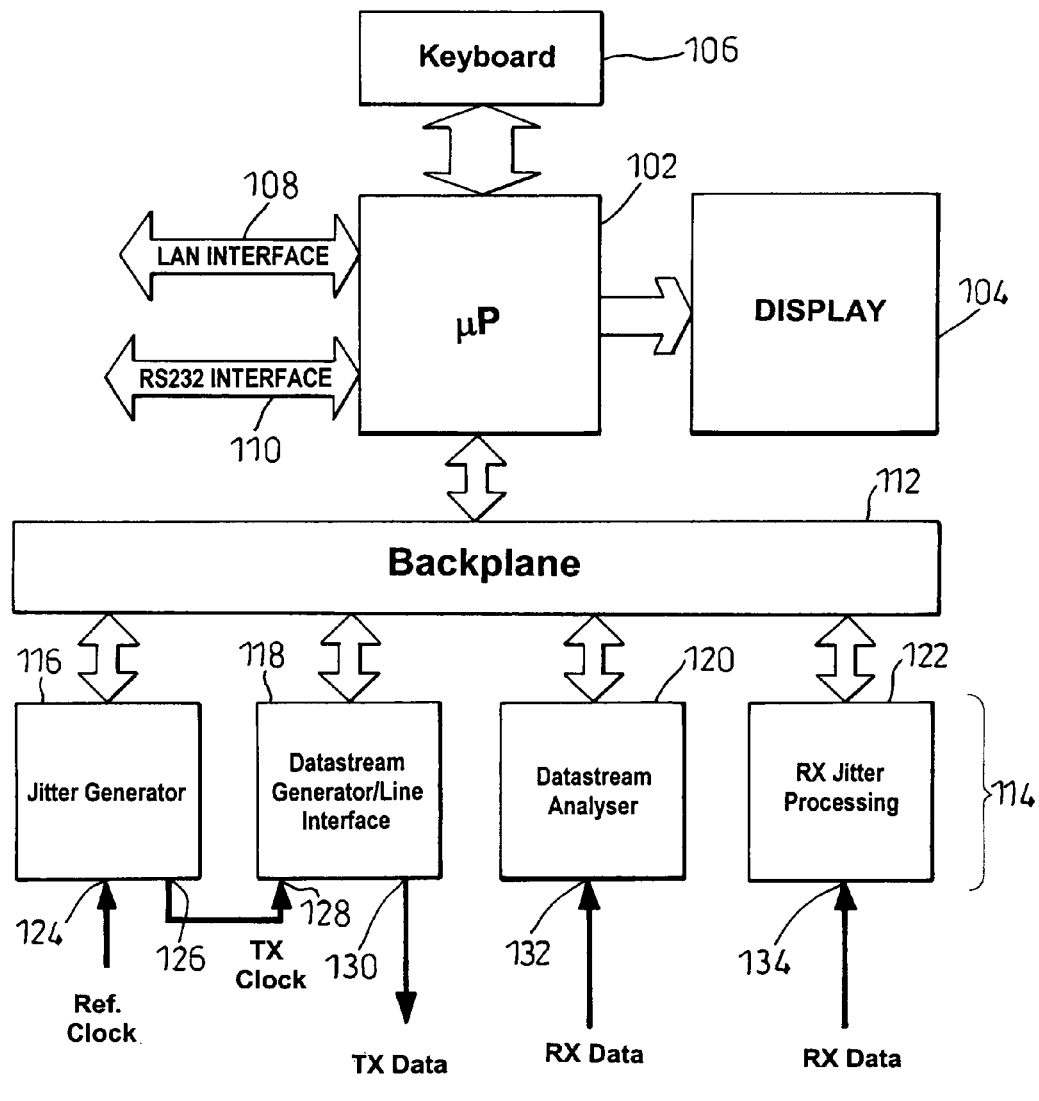
FIG. 1 is a schematic diagram of a jitter measurement apparatus.

Referring to FIG. 1, a jitter test apparatus 100 comprises a microprocessor 102 coupled to an output device, for example, a display 104 and an input device, for example a keypad 106. The jitter test apparatus also comprises a Local Area Network (LAN) interface 108 and an RS232 interface 110 to which the microprocessor 102 is coupled. The microprocessor 102 is coupled to a backplane 112 for coupling to circuit board cards 114 to permit communication of data between the circuit board cards 114, and the microprocessor 102 and the circuit board cards 114.

The circuit board cards 114 comprise a jitter generator card 116, a datastream generator/line interface card 118, a datastream analyser card 120, and a received jitter processing card 122. Since the respective functionalities of the jitter generator card 116, the datastream generator/line interface card 118 and the datastream analyser card 120 are not core to the description of embodiments of the present invention, for the purposes of simplicity and clarity of description, the jitter generator card 116, the datastream generator/line interface card 118 and the datastream analyser card 120 will only be described briefly hereinbelow.

The jitter generator card 116 provides a reference clock input port 124 for receiving a reference clock signal constituting an ideal clock signal for the purpose of transmitting a datastream, for example, a Pseudo-Random Binary Sequence (PRBS). Where test conditions require, the jitter generator card 116 imposes jitter on the reference clock signal. The jitter generator card 116 comprises a transmit clock output port 126 coupled to a transmit clock input port 128 of the datastream generator/line interface card 118 for communicating the reference clock signal to the datastream generator line interface card 118 with, or without, jitter imposed thereupon, as desired. The datastream generator/line interface card 118 is arranged to modulate the reference clock signal with a test datastream, for example, the PRBS, the modulated reference clock signal being provided as an optical output signal at a transmit data output port 130 of the datastream generator line interface card 118.

The transmit data output port 130 is, in this example, coupled to a Device Under Test (DUT) (not shown), a measure of jitter caused by the DUT, and other parameters, being required. A device output port (not shown) at which signals processed by the DUT are provided is coupled, in this example, to an optical amplifier (not shown) and a 50/50 optical splitter (not shown). A first output of the 50/50 splitter is coupled to a first received data input port 132 of the datastream analyser card 120 and a second output of the 50/50 splitter is coupled to a second received data input port 134 of the receiver jitter processing card 122.

The datastream analyser card 120 supports a number of functional entities capable, as would be appreciated by a person skilled in the art, of converting a received optical test datastream to the electrical domain and measuring certain parameters, for example, binary/digital parameters, such as a Bit Error Rate (BER) of the test datastream, or a protocol status measurement of the test datastream.

Alternatively, instead of employing the DUT, the first and second received data input ports 132, 134 of the datastream analyser card 120 and the received jitter processing card 122, respectively, can be coupled directly to an output port (not shown) of an optical communications network (not shown) employing, for example, SONET signals, in order to measure one or more parameter of an output signal present at the output port of the network.

Figure 2:
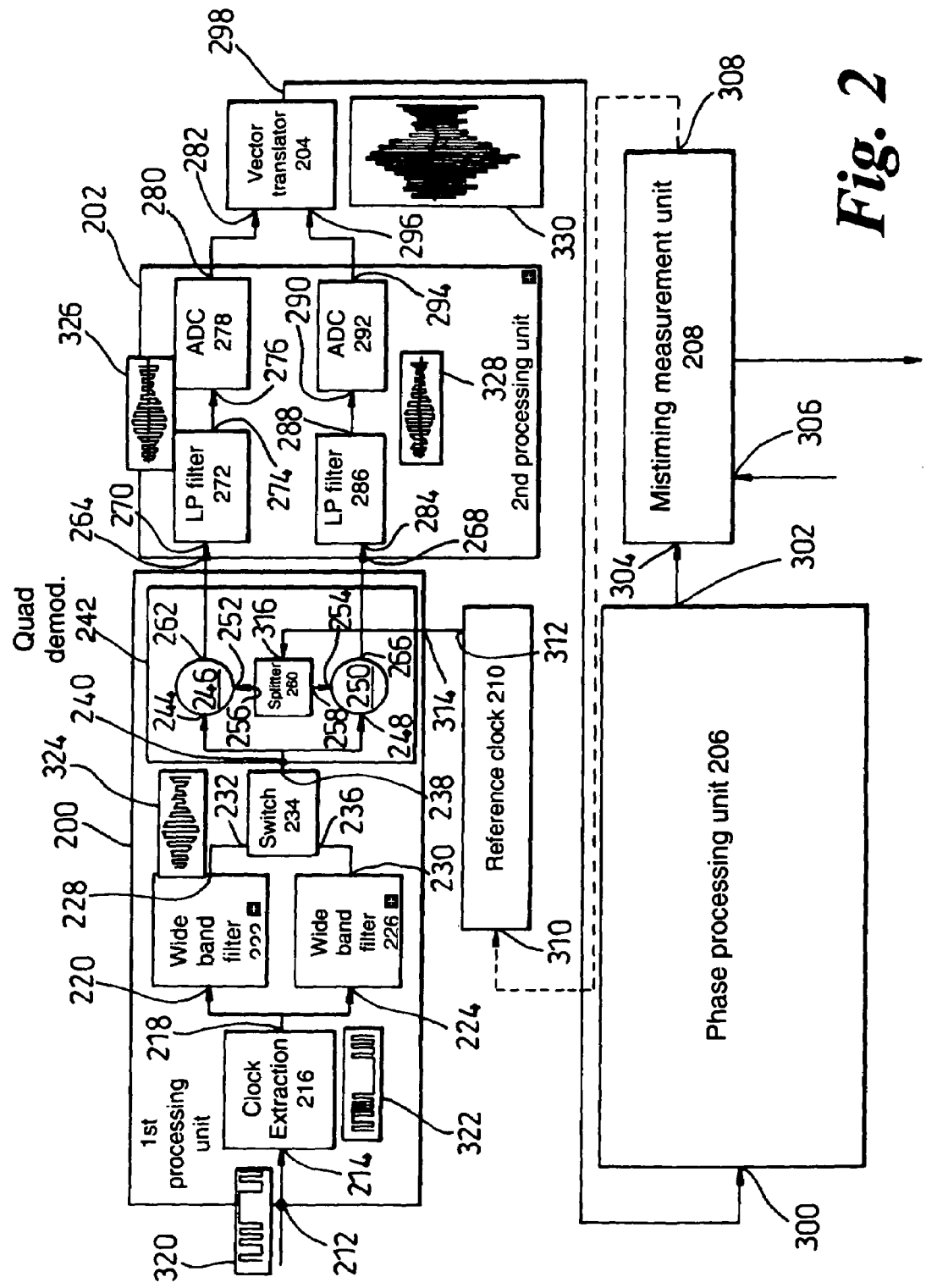
FIG. 2 is a schematic diagram of an apparatus constituting an embodiment of the invention and used in the jitter measurement apparatus of FIG. 1.
Figure 3:
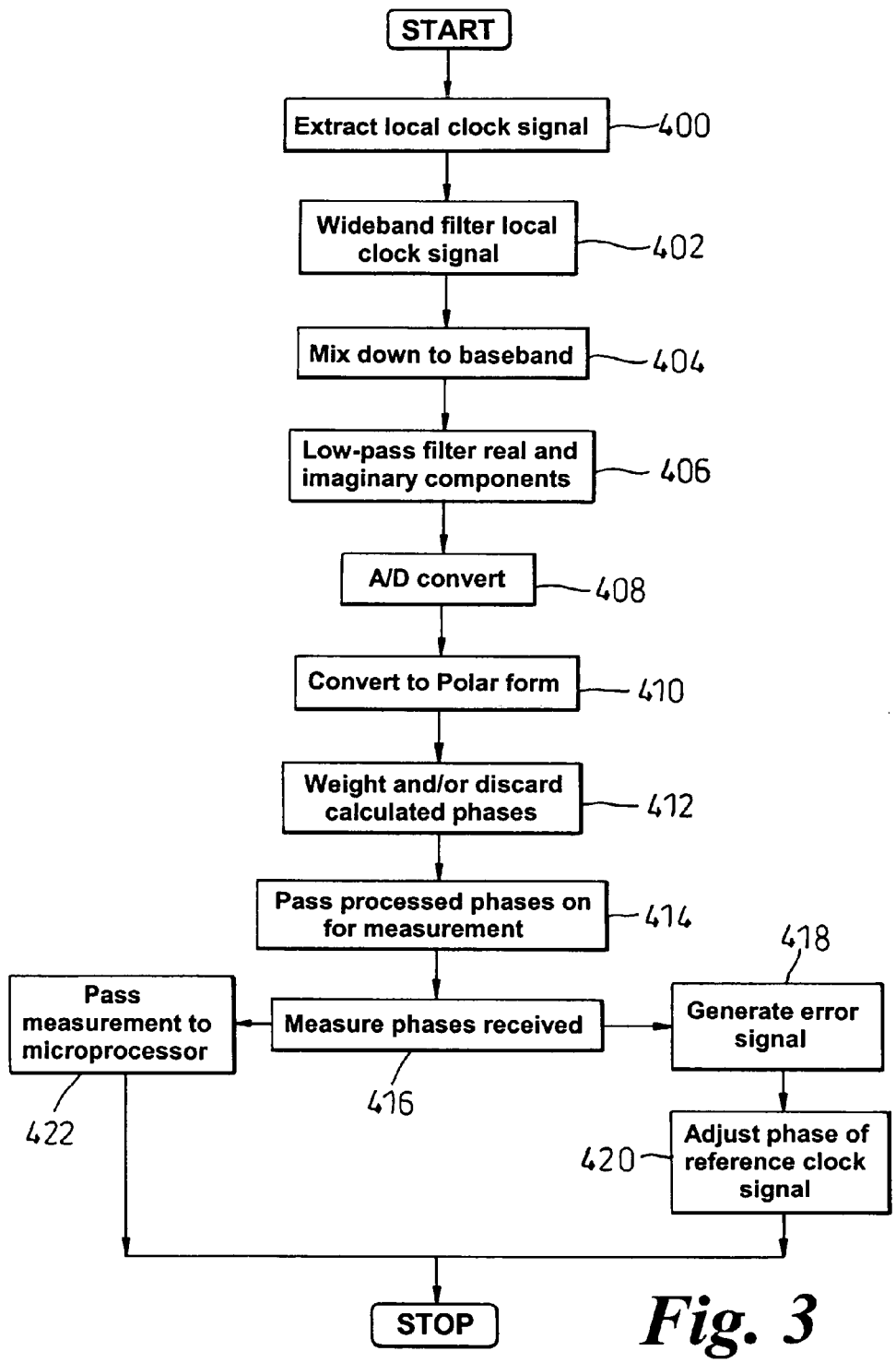
FIG. 3 is a flow diagram of a method executed by the apparatus of FIG. 2.

Referring to FIG. 2, the received jitter processing card 122 is arranged to support a first processing unit 200, a second processing unit 202, a vector translator 204, a phase processing unit 206, a mistiming measurement unit 208, and a reference clock generator 210. For the bit rates involved in this example (40 Gbps/43 Gbps), it is necessary to use Field Programmable Gate Arrays (FPGAs) or an Application-Specific Integrated Circuit (ASIC).

The first processing unit 200 comprises an input 212 coupled to an input 214 of a clock extraction unit 216. In this example, the clock extraction unit 216 is a dual input XOR gate, a first input of which receives the signal under test and a second input of which receives a delayed version of the signal under test, the delay being, for example, about one half of one period of the signal under test. However, it should be appreciated that the clock extraction unit 216 can be realised by other means, for example, a differentiation and rectification arrangement.

An output 218 of the clock extraction unit 216 is coupled to an input 220 of a first wideband filter 222 and an input 224 of the second wideband filter 226. In this example, the centre of the first wideband filter 222 is substantially equal to a central frequency of an SDH OC768 datastream and the centre of the second wideband filter 226 is substantially equal to a central frequency of a central frequency of a SONET OTN3 datastream. The respective bandwidths of the first and second wideband filters 222, 226 are, for example, 3GHz. Of course, the characteristics of the first and second wideband filters 222, 226 depend upon the frequency of a signal being tested.

An output 228 of the first wideband filter 222 and an output 230 of the second wideband filter 226 are respectively coupled to a first input 232 of a switch 234 and a second input 236 of the switch 234. An output 238 of the switch 234 is coupled to a first input 240 of a quadrature demodulator 242. The first input 240 of the quadrature demodulator 242 is coupled to a first input 244 of a first mixer 246 and a first input 248 of a second mixer 250. A second input 252 of the first mixer 246 and a second input 254 of the second mixer 250 are respectively coupled to a first input 256 and a second input 258 of a 90° splitter 260.

An output 262 of the first mixer 246 is coupled to a first input 264 of the second processing unit 202, an output 266 of the second mixer 250 being coupled to a second input 268 of the second processing unit 202. The first input 264 of the second processing unit 202 is coupled to an input 270 of a first low-pass filter 272, an output 274 of the first low-pass filter 272 being coupled to an input 276 of a first Analogue-to-Digital (A/D) converter 278. An output 280 of the first A/D converter 278 is coupled to a first input 282 of the vector translator 204.

The second input 268 of the second processing unit 202 is coupled to a first input 284 of a second low-pass filter 286, an output 288 of the second low-pass filter 286 being coupled to an input 290 of a second A/D converter 292. An output 294 of the second A/D converter 292 is coupled to a second input 296 of the vector translator 204. The bandwidths of the first and second low-pass filters 272, 286 are each set so that they are suitable for measurement of 320 MHz modulation, for example, as specified in the International Telecommunications Union (ITU) 0.172 standard. Clearly, it can be seen that the bandwidths of the first and second low-pass filters 272, 286 are narrower than the bandwidths of the first and second wideband filters 222, 226.

An output 298 of the vector translator 204 is coupled to an input 300 of the phase processing unit 206, an output 302 of the phase processing unit 206 being coupled to a first input 304 of the mistiming measurement unit 208. The mistiming measurement unit 208 also comprises a second input 306 for receiving an external reference clock signal corresponding to an ideal local clock signal. An output 308 of the mistiming measurement unit 208 is coupled to an input 310 of the reference clock generator 210, an output 312 of the reference clock generator 210 being coupled to a second input 314 of the quadrature demodulator 242. The second input 314 of the quadrature demodulator 242 is coupled to an input 316 of the 90° splitter 260.

In operation, a signal under test 320, for example a SONET OC768 40Gbps signal, is received by the first processing block 200 and hence the clock extraction unit 216. By performing a combinatorial XOR logic operation on the signal under test 320 and a delayed version of the signal under test 320, a local clock signal 322 associated with the signal under test 320 is generated (step 400). The local clock signal 322 can contain jitter up to, in this example, 320 MHz. The local clock signal 322 is subsequently split and filtered (step 402) by the first wideband filter 222 and the second wideband filter 226. However, only one output signal from one of the outputs 228, 230 of the first and second wideband filters 222, 226 is permitted to pass to the input 240 of the quadrature demodulator 242 by the switch 234 in response to a control signal. The control signal can either be provided by manual input of a user of the test equipment 100, or in response to a detection of the nature of the signal under test 320 in order to determine a most appropriate wideband filter for measuring jitter in the signal under test 320. In this example, since the signal under test 320 is an OC768 SONET signal, the control signal causes the switch 234 to couple the output 228 of the first wideband filter 222 to the input 240 of the mixer unit 242. Consequently, a filtered local clock signal 324 is communicated to the quadrature demodulator 242, whereupon the filtered local clock signal is split into a first filtered clock signal (not shown) and a second filtered clock signal (not shown).

A reference clock signal (not shown) generated by the reference clock generator 210 is split by the 90° splitter 260 and a first quaderature component of the reference clock signal is mixed with the first filtered clock signal by the first mixer 246. Similarly, a second quaderature component of the reference clock signal is mixed with the second filtered clock signal by the second mixer 250. Consequently, the filtered local clock signal is mixed down (step 404) to baseband and the second processing unit 202 receives a real component of a complex baseband signal (not shown) via the first input 264 of the second processing unit 202, and an imaginary component (not shown) of the complex baseband signal via the second input 268 of the second processing unit 202. It should be appreciated that a substantially 90° phase difference between the real and complex components of the complex baseband signal may not be provided, in some circumstances, by the quadrature demodulator 242. Consequently, any suitable correction technique known in the art can be applied to the real and complex components of the complex base bandsignal. Also, in some circumstances, it is preferable to firstly mix the filtered local clock signal down to an Intermediate Frequency (IF) and then mix the local clock signal at the IF down to baseband.

Subsequently, the real component is filtered (step 406) by the first low-pass filter 272 and the imaginary component is filtered (step 406) by the second low-pass filter 286, resulting in a filtered real component 326 of the complex baseband signal and a filtered imaginary component 328 of the complex baseband signal.

The filtered real component 326 is then converted (408) from the analogue domain to the digital domain by the first A/D converter 278 and the filtered imaginary component 328 is converted (step 408) from the analogue domain to the digital domain by the second A/D converter 292, i.e. the filtered real and imaginary components 326, 328 are digitised. In this example, the first and second A/D converters 278, 292 have sampling frequencies of about 800 MS/s or above. However, the sampling frequencies of the first and second A/D converters 278, 292 can be varied depending upon the frequency of the signal under test 320.

Once digitised, the filtered real and imaginary components 326, 328 are converted (step 410) by the vector translator 204 from being a pair of quaderature components, i.e. rectangular coordinates, into a polar representation 330 of the baseband signal (now low-pass filtered) having an amplitude (magnitude) and a phase. The phase and amplitude of the low-pass filtered baseband signal is communicated by the vector translator 204 to the phase processing unit 206.

The phase processing unit 206 is suitably programmed to generate (step 412) a weighted phase value based upon a given phase associated with a given amplitude received via the input 300 of the phase processing unit 206, but also one or more previously measured phase value, i.e. the weighting can be dependent upon the given amplitude and the relative position of the given phase value with respect to previously measured phase values. In this example, the weighing applied to the given phase is between 0 and 1, and is proportional to the given amplitude. The weighting is applied to the given phase in order to build a measure of confidence into the given phase, the confidence corresponding to a density of transitions in the signal under test 320. For example, if the given phase has been generated in the light of a relatively low density of transitions, confidence in the accuracy of the given phase calculated is correspondingly low. The processed phases are then passed on (step 414) to the mistiming measurement unit 208 for measurement (step 416).

Alternatively or additionally, the phase processing unit 206 is suitably programmed to determine, for the given amplitude associated with the given phase, whether or not the given amplitude is below a predetermined amplitude threshold. If the given amplitude is below the predetermined amplitude threshold, the given phase for the given amplitude is disregarded (step 412) by the phase processing unit 206 as the given phase is below a given confidence threshold represented by the predetermined amplitude threshold. In contrast, when the given amplitude is equal to or above the predetermined amplitude threshold the given phase associated with the given amplitude is communicated (step 414) to the mistiming measurement unit 208, where appropriate hardware and/or software measures (step 416) the value of the given phase, the magnitude of the given phase corresponding to an amount of jitter in the signal under test 320.

As mentioned above, as phase information is received by the mistiming measurement unit 208, the values of the phase information are measured (step 416) by appropriate hardware/software of the mistiming measurement unit 208. When jitter in the signal under test 320 is measured, a non-zero error signal (not shown) is generated (step 418) by the mistiming measurement unit 208 and communicated to reference clock generator 210, the error signal being used by the reference clock generator 210 to track (step 420) the local clock signal 322.

Additionally, if required, the mistiming measurement unit 208 can use the external reference signal constituting the ideal local clock signal in order to provide a measure of wander in the signal under test 320.

Phase and/or wander measurements made by the mistiming measurement unit 208 are subsequently communicated (step 422) to the microprocessor 102 via the backplane 112 for communication of the measurements to the user of the test equipment 100 via the display 104. As would be appreciated by a skilled person, a number of different types of measurement can be made by the mistimings measurement unit 208 from the phase information received from the phase processing unit 206, for example, peak phase measurements and Root-Mean-Squared (RMS) measurements.

Although, in the above examples, the first and/or second wideband filters 222, 226 and the first and second low-pass filters 272, 286 are employed, it should be understood that for certain bit rates of the signal under test 320 below 40 Gbps, the first and, if used, second wideband filters 222, 226 can be replaced with a first, and if required, respective second narrowband filter and the first and second low-pass filters 272, 286 can be omitted. Also, it should be understood that for certain frequencies of the signal under test 320, a greater amount of digital processing than analogue processing of the signal under test 320 can be carried out with appropriate modifications to the apparatus of FIG. 2 that would be readily appreciated by a person skilled in the art.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

What is claimed is:

1. A method of generating a measure of a mistiming in a signal under test, the method comprising the steps of:
   determining a clock signal from the signal under test;
   filtering the clock signal in respect of a first band of frequencies;
   translating the filtered clock signal to baseband so as to provide a complex baseband signal having a real component and an imaginary component;
   representing the real and imaginary components in a polar form, the real and imaginary components having a phase component, corresponding to an amount of mistiming in the signal under test, and a magnitude component; and
   weighting changes in the phase component with a weighting factor corresponding to the magnitude component associated with the phase component.

2. A method as claimed in claim 1, wherein the clock signal is wideband filtered, the method further comprising:
   low-pass filtering the real and imaginary components in respect of a second band of frequencies prior to representation of the real and imaginary components in the polar form, the second band of frequencies being narrower than the first band of frequencies.

3. A method as claimed in claim 1, further comprising:
   digitising the real and imaginary components prior to representation thereof in the polar form, thereby providing a first digitised signal and a second digitised signal.

4. A method as claimed in claim 3, wherein the clock signal is wideband filtered, the method further comprising:
   low-pass filtering the real and imaginary components in respect of a second band of frequencies prior to representation of the real and imaginary components in the polar form, the second band of frequencies being narrower than the first band of frequencies;
   and wherein the real and imaginary components are low-pass filtered prior to digitisation thereof.

5. A method as claimed claim 1, wherein the step of translating the filtered clock signal to baseband further comprises:
   mixing the clock signal down to baseband.

6. A method as claimed in claim 1, wherein the step of translating the clock signal to baseband comprises:
   translating the clock signal to baseband via an intermediate band of frequencies.

7. A method as claimed in claim 1, the method further comprising:
   disregarding the phase component associated with the magnitude component in response to the magnitude component being below a predetermined magnitude threshold.

8. A method as claimed in claim 1, the method further comprising:
   measuring the phase component.

9. A method as claimed in claim 1, the method further comprising:
   using the phase component to generate a control signal to control a source of a reference clock signal for the translation of the clock signal to baseband.

10. A computer program element comprising computer program code means to make a computer execute the method as claimed in claim 1.

11. A computer program element as claimed in claim 10, embodied on a computer readable medium.

12. An apparatus for generating a measure of a mistiming in a signal under test, the apparatus comprising:
   a clock signal extractor for determining a clock signal from the signal under test;
   a first filter for filtering the clock signal in respect of a first band of frequencies;
   a frequency translator for translating the filtered clock signal to baseband so as to provide a complex baseband signal having a real component and an imaginary component; and
   a converter for representing the real and imaginary components in a polar form, the real and imaginary components having a phase component, corresponding to an amount of mistiming in the signal under test, and a magnitude component, and for weighting changes in the phase component with a weighting factor corresponding to the magnitude component of the phase component.

* * * * *